United States Patent Office 3,535,927
Patented Oct. 27, 1970

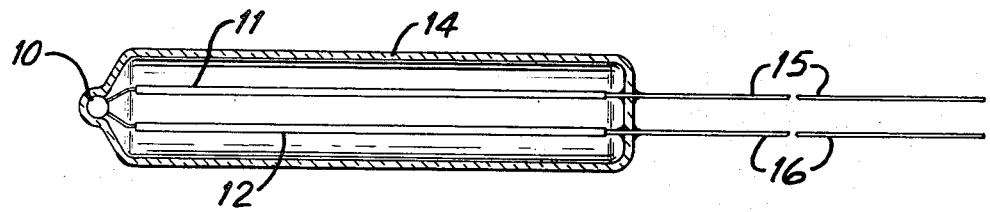
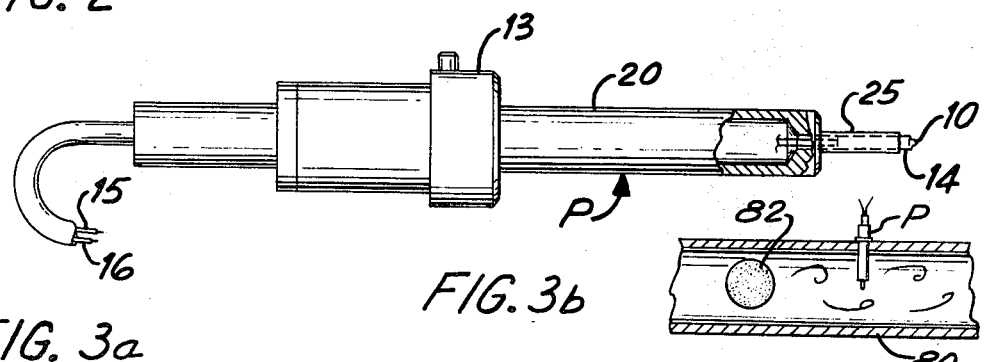
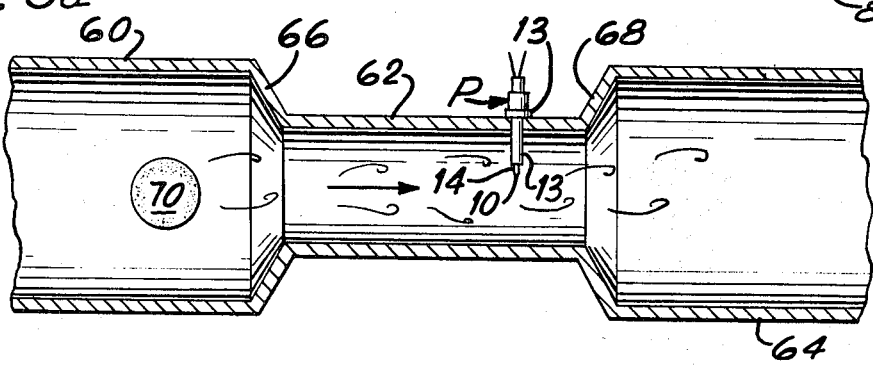
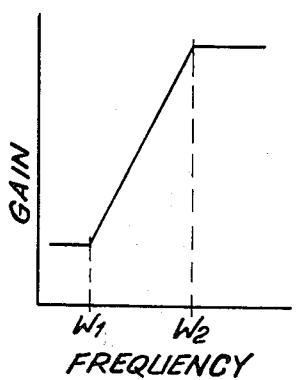
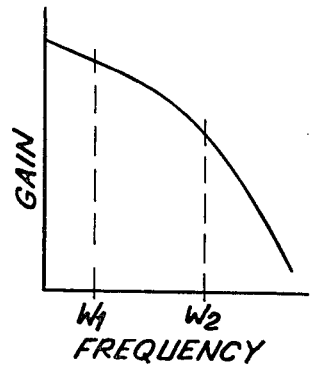
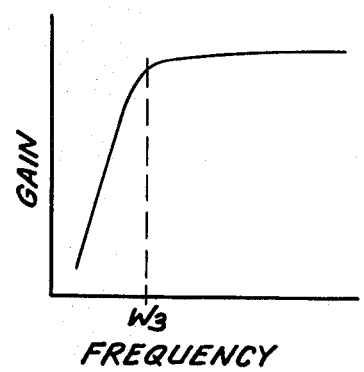

3,535,927
COMPENSATED THERMISTOR SENSOR
Roger F. Mahon, Rahway, and Charles L. McMurtrie, Plainfield, N.J., assignors to American Standard Inc., New York, N.Y., a corporation of Delaware
Filed July 19, 1968, Ser. No. 746,186
Int. Cl. G01f 1/00; G01p 5/00, 5/10
U.S. Cl. 73—194
24 Claims

ABSTRACT OF THE DISCLOSURE

This invention comprises an arrangement for sensing and measuring parameters such as velocity fluctuations and flow rates of a fluid, whether liquid or gaseous, which may be flowing through a pipe. The apparatus comprises a thermistor together with one or more compensation networks arranged so that the combination will provide a substantially linear, i.e. "flat" or substantially uniform relationship between voltage amplitudes across the thermistor such as those associated with periodic fluid oscillations at any generated or other frequency within a rather broad range of frequencies developed by the fluid medium.

---

Figure 5:
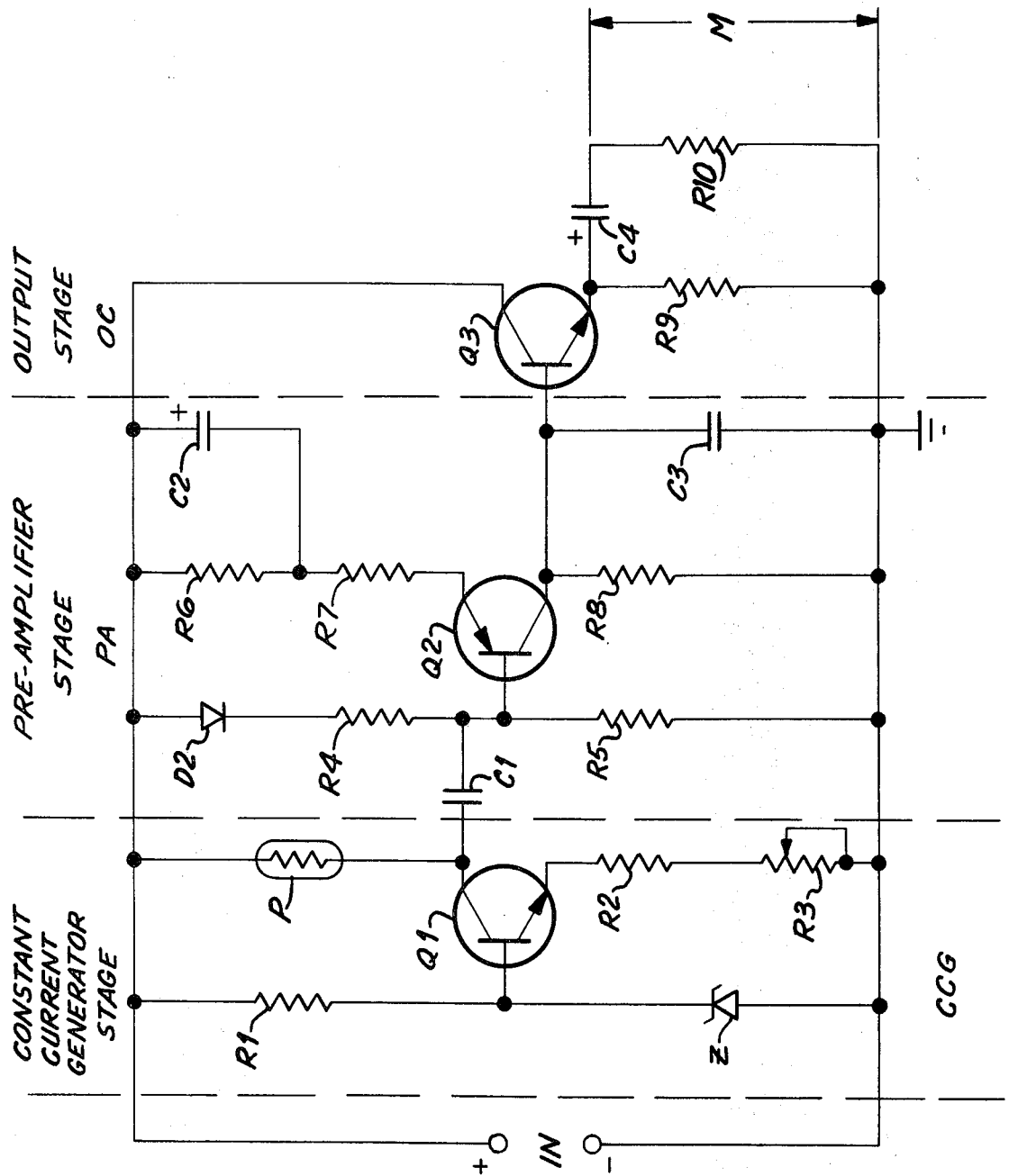

This invention relates to sensing and measuring apparatus and equipment, and, more especially, to sensing and measuring apparatus and equipment which may be suitable for sensing and measuring a parameter of a fluid, such as the velocity or the rate of flow or turbulence of a fluid, whether the fluid be gaseous or liquid.

This invention also relates to thermistor apparatus and especially to such an apparatus as may be suitable and adaptable for sensing or measuring, for example, the velocity or the rate of flow of a fluid whether gaseous or liquid.

This invention also relates to thermistor apparatus for sensing or measuring, with a high degree of accuracy, parameter variations occurring in fluids of any type, and especially to such apparatus for sensing or measuring the variations ocurring in precessing or oscillating fluids.

This invention further relates to thermistor sensing or measuring apparatus arranged and organized to present and exhibit a substantially flat or uniform amplitude-frequency characteristic so as to be able to respond and indicate, with accuracy, the parameter changes occurring in fluids of any type whether or not the fluids are regularly precessing or oscillating.

When a fluid, whether gaseous or liquid, is undergoing changes in velocity as when, for example, the fluid is traversing an enclosure, such as a pipe, having an intermediate section thereof which is, for example, of smaller cross-sectional area than the adjacent segments of the pipe or enclosure, the fluid may undergo regular or irregular precession or oscillation. In such a fluid arrangement, the rate of flow of the fluid may undergo changes corresponding to the degree of whatever precession or oscillation, if any, which may develop and which, in turn, may introduce changes in, for example, the temperature of the associated self-heated thermistor. Hence, the rate of flow of fluid in the enclosure may be determined by accurately sensing or measuring the temperature changes of the thermistor, and hence of the velocity variations that occur in the precessing or oscillating or disturbed fluid.

Such velocity variations as may occur in a pipe or other enclosure for a fluid medium as above-noted are ordinarily quite small in magnitude and rapidly varying and cannot, therefore, be measured by the usual commercial types of thermometric apparatus available in the market. The sensing or measuring instrument, if it is to respond accurately to the accompanying velocity changes in the fluid, should be well immersed in the fluid, so that all shades of changes in the characteristic to be sensed or measured may be accurately observed. Moreover, the instrument should be very rugged so as to be able to withstand the physical properties and the chemical qualities of the fluid and to remain in service over long periods of time. Furthermore, any such instrument, to be feasible and attractive for commercial exploitation, should be relatively low in cost and substantially free of maintenance problems.

Heretofore, in prior studies in fluid dynamics, it had been suggested that a wedge-shaped probe device having a thin platinum film deposited on a glass substrate and covered or shielded by a coating or layer of quartz might be employed for temperature sensing and measuring purposes in fluid media. If such a device is accurately and rapidly responsive to velocity changes of small order, it may well serve to measure the rate of flow of an oscillating or precessing or agitated fluid which, as already suggested, undergoes changes in velocity, i.e., changes in the oscillating or precessing or agitated rate. The probe device just mentioned should be supplied normally with an electrical current to raise the temperature of the platinum film to a level which is higher than the fluid environment in which the platinum film is to be placed for sensing and measuring purposes. Since the electrical resistance of the platinum film is a function of its temperature, and since the temperature effect of the fluid is a function of its precessing or oscillating velocity state or of the agitated state, then it can be stated that if the probe device is immersed in the environment of the fluid, the device may provide an indication of the precessing or oscillating or other changing state and, therefore, of the mean velocity of the fluid. Such a device, because of its operating requirement of a relatively large normal electrical current and because of its inherent relatively high temperature vis-a-vis the effective environmental temperature of the fluid, has been called a "hot wire" or "hot film" type of measuring instrument.

However, a hot film or hot wire instrument is usually too delicate for normal or general commercial application. A platinum film instrument can hardly be used in corrosive or abrasive fluids. It is quite essential that such an instrument be used in clean and non-corrosive fluids such as air and relatively clear water. A gaseous fluid, such as hydrogen chloride, for example, will render the device inoperative in a very short time. Furthermore, such a device is easily breakable during routine handling. These and other limitations, and the costliness of the device, render the device unsuitable for general commercial installations and applications. It has almost solely been used for research studies, rather than any industrial applications.

A bead type of thermistor can be employed for delicate temperature sensing and measurements provided that the changes in the medium to be sensed or measured are not too rapid. Such a thermistor device, which embodies a substantially spherical or semi-spherical bead, has relatively considerable mass and, because of its mass and other physical structure, it may be somewhat slow in its thermal response to the kinds of variations that would occur in precessing or oscillating fluids traversing enclosures such as pipes. Furthermore, a bead thermistor device will exhibit a declining amplitude or voltage characteristic for rises in frequency over a predetermined frequency range because of its inherent thermal inertia. That is, its response would not be uniform but would indeed fall off for a signal of rising frequency encountered in a fluid to be investigated. Furthermore, a high frequency signal which would correspond to a particular flow velocity of a precessing or oscillating fluid, might well be "buried"

or "lost" in the normal and inherent noise level accompanying the fluid under investigation. Hence, such a device would be impractical. According to this invention, a bead type of thermistor may be made useful for sensing or measuring precessing or oscillating or other fluids by the addition of a suitable compensatory network. According to this invention, the addition of the compensatory network will render the thermistor, which has a slow response, suitable for measuring rapidly changing parameters of fluids.

According to this invention, a relatively rugged thermistor sensor, for example, a bead type of thermistor sensor, comprising a bead of any semi-conductive material, such as an oxide of silicon, germanium, cobalt, magnesium, etc., which is covered or encapsulated in any well known protective medium to protect the bead device against the usual destructive forces, will be described hereinafter. The device will be fed a relatively small current, but sufficient to maintain its temperature above that of the surrounding fluid. However, the device will be sensitive to velocity variations occurring in its fluid environment subject to a precessing or oscillating condition or subject to any other varying fluid parameters.

According to the present invention, a thermistor sensor employing such a semi-conductive bead will be combined with a carefully chosen compensating network. The compensating network will have a characteristic which is the inverse of that of the sensor device over a predetermined or operating range of frequencies. Hence, at a particular low signal frequency to be sensed, if the sensor exhibited a relatively large voltage, the compensating network would appear as a relatively small voltage. Conversely, when the sensor developed a relatively low voltage at a much higher frequency in the operating frequency range, the compensating circuit would appear as a correspondingly high voltage. The combination of the sensor and the compensating network would be so coordinated that together they would develop a frequency-response characteristic which would be relatively flat and uniform throughout the range or band of frequencies to be encountered by the sensor in the fluid medium to be investigated.

It is therefore an object of this invention to provide a network having a bead thermistor as a component thereof, so that the network will respond accurately to changes occurring in precessing or oscillating fluids or in other fluids.

It is another object of this invention to combine a thermistor sensor device with a compensating network, or with a plurality of compensating networks, so that the overall combination of the sensor device and the one or more networks will respond substantially uniformly and linearly to the variations in temperature of the fluid to be investigated.

It is another object of this invention to combine a thermistor sensor with one or more compensating networks so that the combination of the thermistor device and the networks will be relatively simple and easy to manufacture and low in cost and substantially free of maintenance problems and expense.

This invention will be better understood from the more detailed description hereinafter following when read in connection with the accompanying drawing in which FIG. 1 illustrates a thermistor body which may be used as a component of this invention; FIG. 2 shows the thermistor body of FIG. 1 mounted in a composite probe housing structure; FIGS. 3a and 3b schematically represent two forms of fluid-carrying equipment to which the invention may be applied; FIGS. 4a, 4b and 4c show curves to explain certain of the principal features of the invention; and FIG. 5 illustrates a schematic circuit arrangement for carrying out the invention.

Throughout the drawing the same reference characters will be employed to designate the same or similar parts.

The device of FIG. 1 illustrates the thermistor body which is one of the principal components of the overall sensing or measuring equipment of this invention. It includes a thermistor bead 10 and a pair of wires 11 and 12 embedded in a solid glass encapsulation or structure 14. The wires 11 and 12 within the glass structure 14 are connected, as shown, to external leads 15 and 16. The glass encapsulation 14, because of its solid construction, eliminates any cavities therein and thereby reenforces and strengthens the physical environment of the thermistor body and, at the same time, preserves the body against the adverse chemical and other factors of the fluid to be sensed, and against the materials that may be suspended in or moved with the fluid, all of which factors may affect the characteristics of the device. The thermistor bead 10 may be composed, for example, of a semi-conductive body of any well-known oxide of silicon, cobalt, germanium, magnesium or of other semi-conductive material which can readily respond to variations in temperature. Ambient fluid temperature conditions will vary the amount of a current which is locally supplied and normally flows through the bead 10, wires 11, 12 and wires 15, 16 so as to maintain the bead 10 above the temperature of the surrounding fluid. Any change in the current serves to measure or sense changes in parameters of the fluid in which the device may be immersed. It will be noted that the tip of the glass encapsulation 14, which is adjacent to the bead 10, encases the bead 10 in a thin wall of glass so that the thermistor bead 10 will be quite fully exposed to ambient velocity variations and will readily respond thereto.

FIG. 2 shows the thermistor body 10 of FIG. 1 encased in a form of probe structure. The probe structure may include a stainless steel holder or collar 13 which has a concentric opening or recess therein, and a second stainless steel structure or tubing 20 which may be in the form of another tube which fits into the opening or recess of the holder or collar 20. The thermistor body 14 (of FIG. 1) is then inserted into a third collar 25 which is received in the inner wall of the tubing 25 and is fixed therein so as to be immovable within the inner wall of tubing 25. The probe device 14 of FIG. 1 is therefore supported by and fixedly held within the concentric tubes 13, 20 and 25. If desired, the components 13 and 20, or the components 13, 20 and 25, may be formed from the same material whether it be steel or other metal or plastic.

FIG. 3a shows an example of a piping arrangement in which the probe body 14 of FIG. 2 may be insered for sensing or measuring parameters of the fluid which may be in motion therein. In FIG. 3a are shown three adjacent pipe sections 60, 62 and 64, the section 60 and section 62 being coupled by a tapered wall or coupler 66 as shown, and the sections 62 and 64 being likewise coupled to each other by another and similar tapered coupler 68. Assume that a body 70, shown generalized in FIG. 3, may have been introduced into the conduit 60, 62, 64 and hence has caused the fluid flowing therethrough either to precess or oscillate or otherwise to undergo any type of disturbance. It will be apparent that the fluid which is so disturbed will change its normal flow path, perhaps eddying or swirling. In any case, any change in the flow path will inherently become subject to velocity changes. Such temperature changes developed in the probe or thermistor will normally correspond to the amount of change in fluid velocity (or fluid pressure, for example). Hence a sensing or measuring device, such as the probe structure inserted in the conduit as shown in FIG. 3, will respond to the velocity fluctuations. The temperature fluctuations in the heated probe correspond to the fluid fluctuations and serve to reveal the fluid fluctuations. If the fluid is precessing or oscillating at a determinable or predetermined frequency, the probe device, by responding to the velocity fluctuations associated with the precessing or oscillating fluid, can reveal the state of the oscillation or precession. Therefore, if the frequency of precession or oscillation were to rise in an uncompensated probe device, the voltage developed by the probe device would fall off due to the inherent thermal inertia. Conversely, the voltage across the uncompensated probe device would be increased in response to any reduction in the precessing or oscillating frequency. Indeed, the probe device 14 will, by means of its encased thermistor 10, detect and respond to temperature changes which, in turn, correspond to pressure or velocity changes occurring in the fluid flowing through the piping arrangement. This detection will be indicated by the probe structure 14 and by the measuring equipment connected thereto, whether or not the fluid is oscillating or precessing regularly.

FIG. 3b shows a cylindrical pipe 80 within which there may be a spherical or other shaped body 82 in the path of the fluid medium. The body 82 may be capable of rendering the flow regularly or irregularly oscillatory. For example, the body 80 may produce a well known type of vortex shedding. The flow passing body 80 may be considered as composed of a steady component and a fluctuating component. The steady component may correspond to the steady flow past the probe P while the fluctuating component may correspond to the oscillatory flow resulting from the vortex eddies.

It will be shown hereinafter in connection with FIGS. 4 and 5 that the bead thermistor probe structure 14, if unaccompanied by an appropriate compensatory network, will be unable to respond properly to the changes in velocity or other parameters of the fluid to be sensed and investigated. Indeed, without good compensation and without sufficient amplification, the parameter changes will be quite undetectable and probably lost.

Before considering the functional features of compensation employed in this invention, reference is now made to FIG. 5 which illustrates a so-called compensated amplifier for the probe structure employed in this invention. The network of FIG. 5 may be broken down into three stages, (1) the constant current generator stage CCG, (2) the pre-amplifier stage PA, and (3) the output stage OC. The input power consists of any well known D.C. source connected to the terminal 1N. The probe device is schematically shown and designated as P. The voltage derived from the FIG. 5 arrangement is fed through terminals M to any well known meter which may be calibrated in velocity or frequency units, but a velocity calibration may be preferred for many type of installations.

The constant current generator stage shows the applied D.C. voltage of circuit 1N supplied across the resistor $R_1$ and the Zener diode Z. The Zener diode establishes a constant D.C. voltage at the base of transistor Q1. Neglecting changes due to temperature effects to which transistor Q1 may be subjected, a substantially constant D.C. voltage $V_E$ will be applied to the emitter of this transistor and hence the emitter current $I_E$ will obviously be:

$$I_E = \frac{V_E}{R_2 + R_3}$$

This expression, employing elements of substantially constant magnitudes, indicates that the emitter current $I_E$ will also be substantially constant.

It will be apparent that, since the emitter current $I_E$ is equal to the sum of the collector current $I_C$ and the base current $I_B$, the base current $I_B$, which is determined by the voltage across the Zener diode Z, is also substantially constant. Hence, the collector current $I_C$ must also be constant. The probe P, which is fed the same current $I_C$, receives only a substantially constant current. As velocity variations are sensed by the probe P in a fluid medium such as that shown in FIG. 3, any velocity changes occurring in the fluid medium due to disturbances or oscillations of the medium will develop corresponding changes in the probe's temperature and hence changes in the probe's resistance.

These resistance changes produce corresponding voltage variations which may be treated as an A.C. signal to be detected by the equipment of this invention. This A.C. signal is supplied to the pre-amplifier stage PA via capacitor $C_1$.

The pre-amplifier stage PA is interposed between the terminal common, the collector of transistor $Q_1$ and the probe P. This stage is designed to amplify the signal picked up by probe P and feed the amplified signal to the output stage OC. This signal is fed through capacitor $C_1$ to a voltage divider comprising the diode $D_2$ and resistors $R_4$ and $R_5$ which are connected in series with each other across the circuit 1N to which D.C. voltage is applied as already noted. This voltage divider provides the desired bias condition for the operation of transistor $Q_2$.

Transistor $Q_2$ is employed to act as a voltage amplifier which has a readily determinable voltage gain. By careful selection of the interconnected elements, the overall gain of the pre-amplifier stage PA will be a function of the frequency of the signal derived from the probe P. The curve of FIG. 4a shows the relationship of the gain of the stage PA for different values of frequency, the curve having sharp corners merely for illustration. The lower corner of the curve of FIG. 4a is determined principally by the constants of resistors $R_6$ and capacitor $C_2$. The lower frequency corner can be shown as occurring at frequency $W_1$.

$$W_1 = \frac{1}{R_6 C_2}$$

The frequency $W_2$ at the upper corner can be expressed as follows:

$$W_2 = \frac{R_6 + R_7}{R_6 R_7 C_2}$$

Thus, the curve of FIG. 4a shows a rising gain characteristic between the frequencies $W_1$ and $W_2$ and the slope of the curve is substantially uniform between the two frequencies. That is, the gain rises as the signal frequency rises from $W_1$ to $W_2$.

The normal characteristic of the probe device P, if the device were removed from the network of FIG. 5, would be somewhat as shown in FIG. 4b. The signal from the probe device would have a falling characteristic quite the opposite of that shown in FIG. 4a. The curve of FIG. 4b indicates that the signal of the device would fall off with increase in the signal frequency. Such a falling characteristic is quite unsatisfactory, for various reasons. One reason is that at the higher signal frequencies, the signal would be so low that the low frequency noise of the fluid being sensed might well overlap and overcome the signal to be detected. The signal would therefore be undetectable and lost. Another reason is that the slope of the curve of FIG. 4b is not substantially flat over the frequency range of the signals to be detected. For good and reliable measurements, it is desirable that the signal amplitude be substantially constant. The ideal characteristic would be flat over the entire range of the signal frequencies available at the probe device P, and the signal level should be higher than the noise level encountered throughout the entire signal frequency range.

The output stage OC of FIG. 5 consists essentially of a transistor employed to act as an emitter-follower. The upper terminal common to resistor $R_8$ and capacitor $C_3$ is connected to the base of transistor $Q_3$. The emitter of transistor $Q_3$ is connected through resistor $R_9$ to ground and its collector is connected to the positive pole of the input voltage IN. The emitter is also connected through capacitor $C_4$ to terminal M and terminal M is bridged to ground by resistor $R_{10}$. As will be apparent, the output state OC presents a high input impedance to the pre-amplifier stage PA and a low output impedance facing the output terminal M.

The combination of transistor $Q_3$, resistors $R_9$ and $R_{10}$ and capacitor $C_4$ constitute the emitter follower. Capacitor $C_4$, resistor $R_{10}$ and the impedance of transistor $Q_3$ when looking into the emitter of transistor $Q_3$, provide compensation in addition to the compensation supplied by the pre-amplifier stage PA. The circuit of the output stage OC may be regarded as a high pass network.

The addition of the compensation supplied by the output stage OC improves the response of the system quite considerably. The overall gain of the entire system, including probe P, the pre-amplifier stage PA and the output stage OC, are generally shown by the curve of FIG. 4c. In FIG. 4c, the gain is substantially flat (as exhibited by the general horizontality of the curve) from a frequency $W_3$ over a very wide range extending upwardly above frequency $W_3$. This range of frequencies is wider than the range $W_1$ and $W_2$ of FIG. 4a. Even greater flatness (or horizontality) may be achieved by adding further compensation.

The combined or overall compensation provided by the pre-amplifier stage PA and by the output stage OC converts the gain-frequency characteristic of the sturdy bead probe device P, with its declining voltage as the signal frequency increases, into a gain-frequency characteristic which is essentially flat and substantially uniform at a band of frequencies encountered by the probe device P. In other words, the compensatory networks present a gain-frequency characteristic which is the image exhibited by FIG. 4b. A velocity sensitive probe, itself valueless without compensation, is rendered useful and practical in sensing and measuring small amplitude changes in the velocity of the fluid medium.

The ruggedness of the bead thermistor device and its compensatory structures are suitable for sensing a wide range of velocity variations in the fluid. An instrument connected to terminal M will reveal the changing fluid phenomena.

The employment of a semi-conductive thermistor material renders the probe highly sensitive and, of course, much more sensitive than a fully conductive device such as platinum. By improving the sensitivity, a greater change in voltage across the probe will be obtainable than in the case of a less sensitive material. Furthermore, a greater protective coating may be applied to the more sensitive material and still retain a good signal amplitude.

The following constants were employed in one installation built in accordance with this invention.

$R_1$—1K ohms  
$R_2$—150 ohms  
$R_3$—470 ohms  
$R_4$—1K ohms  
$R_5$—27.4K ohms  
$C_1$—28 µf.  
$C_2$—0.2 µf.  
$C_3$—470 pf.  
$C_4$—0.0033 µf.  
$R_6$—4.02K ohms  
$R_7$—1K ohms  
$R_8$—75K ohms  
$R_9$—36K ohms  
$R_{10}$—36K ohms  
Z—1N5228B  
$Q_1$—2N1711  
$Q_2$—2N3906  
$Q_3$—A1380  
1N—15 v. D.C.  
D2—1N4001

While this invention has been shown and described in certain particular arrangements, with schematic curves, merely for illustration and explanation, it will be obvious and apparent to those skilled in the art that this invention and the general principles thereof may be embodied in many and widely varied organizations without departing from the spirit and scope of this invention.

What is claimed is:

1. In an arrangement for measuring parameter variations of a fluid flowing through a conduit, over a predetermined wide range of frequencies of said variations, the combination of a thermistor having a sloping signal-frequency characteristic over said predetermined range of frequencies, means for converting said thermistor signal-frequency characteristic from sloping to substantially non-sloping, said means comprising a network having a signal-frequency characteristic which is substantially the image of the signal-frequency characteristic of said thermistor over substantially the same range of frequencies, and a measuring device coupled to said thermistor and said compensatinf network.

2. The combination of claim 1, in which the thermistor is a bead of semi-conductive material.

3. The combination of claim 1, in which an amplifier is added.

4. The combination of claim 1, in which the network comprises a transistor and a resistive-capacitive component.

5. The combination of claim 4 including, in addition, means for feeding a constant D.C. current to energize said thermistor.

6. The combination of claim 5 including a fluid medium into which the thermistor is immersed to sense changes in parameters of the fluid medium.

7. The combination of claim 6 including, in addition, an indicating device to observe the parameter changes of said fluid.

8. In an arrangement for measuring parameter variations of a fluid flowing through a conduit, over a predetermined wide range of frequencies of said variations, the combination with said conduit of a bead thermistor probe which is inserted into said conduit for sensing variations of parameters of the fluid traversing said conduit, said probe having a voltage-frequency characteristic which declines for increasing frequencies of the variations sensed by said probe, a plurality of compensating networks which have a voltage-frequency characteristic which rises for increasing frequencies of variations sensed by said probe, and a measuring device coupled to said compensating networks for indicating parameters of the fluid traversing said conduit, said measuring device exhibiting the parameters.

9. In an arrangement according to claim 8, the addition of an amplifier for amplifying the frequencies to be fed to the measuring device.

10. In an arrangement according to claim 9, the plurality of compensating networks together exhibiting the inverse of the rising voltage-frequency characteristic of the probe.

11. In an arrangement according to claim 8 in which each compensating network consists of an resistor-capacitor combination.

12. In an arrangement according to claim 10, in which each compensating network comprises a transistor and a resistor-capacitor combination.

13. In an arrangement according to claim 12, in which the compensating networks are connected in tandem between the bead thermistor probe and the measuring device.

14. In an arrangement according to claim 13, in which the combination includes a constant current source for feeding unvarying current to the probe.

15. In an arrangement according to claim 14, in which a Zener diode is included in the constant current source.

16. In an arrangement according to claim 8 in which the bead thermistor device includes a semi-conductive material.

17. In an arrangement for measuring the frequency of selected variations in the flow of a fluid through a conduit, over a predetermined wide range of frequencies, the combination which comprises:
   thermistor means disposed in said conduit for sensing said variations and for developing a first output voltage having frequencies which include:
      a signal frequency corresponding to the frequency of said variations, and
      noise frequencies,
   said thermistor means being characterized by a frequency response in which amplitude decreases as frequency increases over said range of frequencies, and
   compensating means to which said first output voltage is applied and which has a frequency response which is substantially the inverse of said frequency response of said thermistor means so that the combined frequency response of said thermistor means and said compensating means is substantially flat over said range of frequencies, said compensating means deriving from said first output voltage a second output voltage having frequencies which include:

a signal frequency corresponding to said frequency of said variations, and noise frequencies, the level of said signal frequency being higher than the lever of said noise frequencies throughout said range of frequencies.

18. In combination with the arrangement defined in claim 17, means disposed in said conduit for causing said fluid to precess, thereby producing said variations in the flow of said fluid.

19. Apparatus for measuring the frequency of oscillations in the flow of a fluid through a conduit, over a predetermined wide range of frequencies, which comprises:

means disposed in said conduit for producing oscillations in the flow of said fluid, thermistor means disposed in said conduit for developing from said oscillations of said fluid a first output voltage having frequencies which include:

a signal frequency corresponding to the frequency of said oscillations, and noise frequencies, said thermistor means being characterized by a frequency response in which amplitude decreases as frequency increases, and compensation means supplied with said first output voltage and characterized by a frequency response which is substantially the inverse of said frequency response of said thermistor means so that the combined frequency response of said thermistor means and said compensation means is substantially uniform over said range of frequencies, said compensation means generating from said first output voltage a second output voltage having frequencies which include:

a signal frequency corresponding to the frequency of said oscillations, and noise frequencies, the level of said signal frequency being higher than the level of said noise frequencies throughout said range of frequencies.

20. Apparatus for measuring the frequency of oscillations in the flow of a fluid through a conduit, over a predetermined wide range of frequencies, which comprises:

vortex shedding means disposed in said conduit to produce vortex eddies in said fluid flowing past said vortex shedding means, said vortex eddies resulting in oscillations in the flow of said fluid, thermistor means disposed in said conduit for developing from said oscillations in the flow of said fluid a first output voltage having frequencies which include:

a signal frequency corresponding to the frequency of said oscillations, and noise frequencies, said thermistor means being characterized by a frequency response in which amplitude decreases as frequency increases, and compensation means supplied with said first output voltage and characterized by a frequency response which is substantially the inverse of the frequency response of said thermistor means so that the combined frequency response of said thermistor means and said compensation means is substantially uniform over said range of frequencies, said compensation means deriving from said first output voltage a second output voltage having frequencies which include:

a signal frequency corresponding to the frequency of said oscillations, and noise frequencies, the level of said signal frequency being higher than the level of said noise frequencies throughout said range of frequencies.

21. Apparatus as defined in claim 20 wherein said vortex shedding means comprises a shaped body.

22. Apparatus as defined in claim 20 wherein the composition of said thermistor means is selected from the group of semi-conductive materials consisting of an oxide of silicon, cobalt, germanium or magnesium, and wherein said selected semi-conductive material is encapsulated in a selected protective medium.

23. Apparatus as defined in claim 20 wherein said compensation means includes an amplifier characterized by a gain which increases with frequency over said range of frequencies.

24. In combination with the apparatus defined in claim 20, means supplied with said second output voltage for observing said signal frequency.

References Cited

Raymond A. Runyan et al.: Empirical Method for Frequency Compensation of the Hot Wire Anemometer, Technical Note Natl. Advisory Committee for Aeronautics, June 1947.

Technology Incorporated Bulletin 505, Linear Measurement of the Mass Flow, of Gaseous Media, October 1966.

RICHARD C. QUEISSER, Primary Examiner

J. K. LUNSFORD, Assistant Examiner

U.S. Cl. X.R.

73—204